Aug. 21, 1956 B. KOPELMAN 2,760,126

TUNGSTEN BRONZE RECTIFIERS

Filed Jan. 30, 1953

INVENTOR
BERNARD KOPELMAN
BY [signature]
ATTORNEY

United States Patent Office 2,760,126

Patented Aug. 21, 1956

2,760,126

TUNGSTEN BRONZE RECTIFIERS

Bernard Kopelman, Flushing, N. Y., assignor to Sylvania Electric Products Inc., a corporation of Massachusetts Application January 30, 1953, Serial No. 334,316

9 Claims. (Cl. 317—238)

This invention deals with crystal rectifiers of the point contact or area contact type. More particularly, it relates to a group of novel compositions consisting primarily of non-stoichiometric compounds of tungsten, oxygen and alkali metals in the form of crystals which are effective as crystal rectifiers.

A crystal rectifier is a non-linear device which has the property of transforming alternating current into direct current and is capable of handling fairly broad frequencies of alternation of the source current. Such crystal rectifiers depend for their action for the most part on the presence of regions or areas generally at the surface through which current is conducted more readily in one direction than in the opposite direction. Such regions or areas have been designated as barrier layers. These barrier layers are extremely thin and their effectiveness may be designated by the fact that normally the resistance in the non-conducting direction may be several thousand times higher than the resistance in the conducting direction.

Two early standard means have been developed for using such rectifiers. The first involves application of an extremely fine point. A major function of the use of such point contacts is miniaturization and reduction in electrostatic capacity. Under these conditions the crystal rectifier is suitable for high frequency purposes and is used as a detector in the micro-wave region as a substitute for a vacuum tube. As a matter of fact point contact crystal rectifiers were very common devices in the earlier history of radio communication as detectors. They fell into obscurity with the development of the vacuum tube and again became quite important later in the years with the expansion of communications in the high frequency and microwave regions. The area type rectifier is most useful for power conversion purposes in which the transference of massive amounts of A. C. power into comparable D. C. power is desired. When made into large banks such fixed rectifiers are efficient substitutes for motor generator sets.

In the early days the most common crystal rectifier was galena and as indicated an important component of such early radio receivers was a piece of galena and its attendant cat whisker. More recently, germanium and silicon have emerged as important crystal rectifier material for the point contact construction. Materials most useful for power conversion purposes are selenium and copper oxide.

Germanium and silicon point contact rectifiers suffer from several disadvantages. Germanium is an expensive material and must be very carefully processed in order to obtain the best results and, furthermore, breaks down electrically at a relatively low temperature. While the resistance ratios are high for this material and the voltage of operation are correspondingly high the current carrying capacity is relatively low. In view of the method of preparation of both silicon and germanium these materials are inherently expensive. In the case of both selenium and copper oxide the most common type of plate or area type rectifying material the voltage carrying capacity is relatively low, in terms of the electrical engineer, the back voltage seldom exceeds 50 to 60 volts.

The general field of crystal rectifiers is an exceptionally important one in electrical engineering and communication.

It is an object of this invention to develop a group of crystal rectifier materials which are useful both as point contact and area type rectifiers.

It is another object of this invention to develop materials which are relatively inexpensive and which may be processed by a simple means to make them useful both as point contact and area type rectifiers.

It is a still further object of this invention to develop crystal rectifiers which under proper operating conditions will stand exceedingly high operating voltages and high operating currents so that when properly used they exhibit advantages over existing fixed rectifying devices.

It is a still further object of this invention to develop crystal rectifiers which under proper conditions will stand high operating temperatures.

In accordance with this invention these and other advantages which are incidental to their application can be attained with the non-stoichiometric compounds grown from mixtures of alkali metal with tungstic oxide.

In the accompanying drawings which illustrate preferred forms of devices embodying features of this invention Figure 1 is a perspective view partly in section showing a crystal of a complex alkali metal tungstic oxide having a conductive coating on one surface and an oxidized film on another.

When alkali metal atoms such as sodium are added to tungstic oxide the complex material formed seems to acquire metallic properties and if a barrier layer is formed by oxidation of one of the surfaces the crystal formed functions as an efficient rectifier.

The most common of the crystals which have been formed in this manner are those which might be represented by the formula $R_xWO_3$ in which $x$ represents a value of between .5 and 1.

Figure 1:
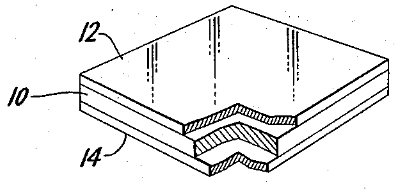

In Figure 1 of the drawings 10 represents a single crystal of the complex material, 12 represents an oxide coating on the top surface of the complex material and 14 represents an electrically conducting coating.

Figure 2:
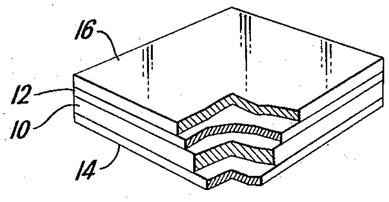
Figure 2 is a perspective view partly in section of an area type rectifier of this invention.

In Figure 2 of the drawings, there is shown an area type rectifier which incorporates the structure shown in Fig. 1 and further includes a conventional area type electrode 16 formed from a metal of high electrical conductivity and covering the top surface of the oxide coating 12.

Figure 3:
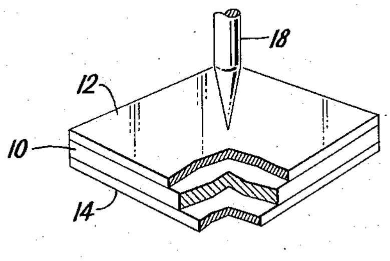
Figure 3 is a perspective view partly in section of a point type rectifier of this invention.

In Fig. 3 of the drawings, there is shown a point contact type rectifier which incorporates the structure shown in Fig. 1 and further includes a conventional point type contact 18 formed from a metal of high electrical conductivity, the tip of the contact making point contact with the oxide coating 12.

The general method of preparation of the non-stoichiometric compounds of the general chemical formula $R_xWO_3$ where R represents an alkali metal and $x$ lies between .5 and 1 is to take measured amounts of the alkali metal tungstate, tungstic acid and tungsten powder, mix them thoroughly together, form a homogeneous mixture and then heat them in a suitable crucible such as quartz to a temperature of about 1000° C. at which temperature a molten mass is formed. This molten mass is then permitted to cool slowly over an extended period of time down to a temperature of about 700° C. and then more rapidly to room temperature. During the period of cooling crystals of the non-stoichiometric compound are formed. These crystals which when properly treated to give a barrier layer function as efficient rectifiers. In the case of the sodium compounds the crystals might be said to be prepared in accordance with the following chemical reaction:

$$3Na_2WO_4+2WO_3+W$$

yields $Na_xWO_3$. When prepared in accordance with this formula the value for $x$ is somewhere near 0.66.

The barrier layer may be applied to one of the surfaces of the crystal in any one of the number of ways normally used for the application of such barrier layers. One layer which has proven to be suitable for this purpose is to electrolytically oxidize the surface using a lead nitrate-nitric acid-water solution. A typical solution of this type can be made by mixing together 20 grams of lead nitrate c. p., 160 cc. of concentrated nitric acid, 10 drops of concentrated sulfuric acid and 1000 cc. of water. This mixture is stirred until any white precipitate of sulfate which may form redissolves. When this solution is used for the electrolytic oxidation of the crystal surface which is used in the anode, and the electrolysis is carried out for 1½ to 2 minutes at 20 ma. current, the deposit formed is colored reddish brown to brownish black.

For best results the other surface should of course have the best possible contacts. This can be obtained in any number of ways. One of the ways which is preferred is to wash the crystal in 48% hydrofluoric acid to clean the surface and then face the electrode which is to be used with a layer of copper. This can, for example, be placed thereon by electrolysis to produce a very excellent contact surface.

In accordance with a preferred embodiment of this invention four parts of sodium tungstate were mixed with two parts of tungstic acid and one part of tungsten powder. These were thoroughly mixed and heated in a quartz crucible and heated to a temperature of about 1000° C. The temperature was held at this point until the whole mass became molten. The molten mass was then gradually reduced in temperature to 650° C. during a period of 18 hours after which the temperature was allowed to drop more rapidly. During the cooling operation from 1000° to 650° C. the non-stoichiometric compounds are crystallized out to the form of large crystals. The entire heating and cooling operation was carried out in an atmosphere of argon. This atmosphere could, of course, have been any other inert gas or the reaction might well have been carried out in vacuum.

The mass obtained upon cooling of the mixture is first washed with water in order to remove all of the soluble compounds which may be present after which it is treated with concentrated sodium hydroxide to remove any silicates which might be present. It has then been found to be desirable to treat the remaining substance with hydrofluoric acid having a concentration of 48–52% at a temperature of about 25° C. This cleans the crystals and leaves them ready for further treatment such as the application of the barrier layer. This layer as has been indicated heretofore in the specification is preferably applied by electrolytic oxidation from a lead nitrate bath, the composition of which has been previously given. The electrolysis is carried out for about 1½ to 2 minutes at 20 ma. whereupon a reddish brown to brownish black deposit is formed on one surface of the crystal. The opposite surface of the crystal is then swabbed with hydrofluoric acid in order that good electrical contacts may be made thereon. As has been indicated heretofore if a layer of copper is plated onto this cleaned surface a very excellent contact can be obtained. Even in those cases in which the material has not been specially prepared to make the best electrical contact the following forward current characteristics have been observed at the various ambient temperatures given in the chart. The contact area is about 1 mm.².

| Volts | Forward Current—Milliamps | | | |
|---|---|---|---|---|
| | 40° C. | 108° C. | 154° C. | 212° C. |
| 1 | 0 | 2 | 2 | 0 |
| 1.25 | 5 | 20 | 20 | 5 |
| 1.5 | 20 | 200 | 80 | 20 |
| 2.0 | 200 | ---------- | 200 | 70 |
| 3.2 | ---------- | ---------- | ---------- | 200 |

PB voltage 15 volts D. C., 38 volts dynamic.

The reverse current characteristics which have been noted with similar crystals are set forth in the following chart:

| Volts | Back Current—Microamps | | | |
|---|---|---|---|---|
| | 40° C. | 108° C. | 154° C. | 212° C. |
| 2 | 50 | 35 | 5 | 5 |
| 4 | 130 | 75 | 25 | 30 |
| 6 | 250 | 160 | 75 | 125 |
| 8 | 400 | 275 | 200 | 300 |
| 10 | 600 | 400 | 400 | 600 |

From these figures as given in the above charts it is readily apparent that the stoichiometric compounds which are frequently referred to as tungsten bronzes have excellent rectifying characteristics and can withstand very high temperatures without breaking down. These characteristics are very desirable and make these materials well suited for either point contact or area type rectifier.

While the above description and drawings submitted herewith disclose a preferred and practical embodiment of the rectifiers of this invention it will be understood by the specific details of construction and arrangement of parts as shown and described are by way of illustration and are not to be construed as limiting the scope of the invention.

What is claimed is:

1. A current rectifier comprising an electrode of a non-stoichiometric compound having an oxidized surface, said compound having the general chemical formula $R_xWO_3$ where R represents an alkali metal and $x$ lies between 0.5 and 1.

2. A current rectifier comprising an electrode of a non-stoichiometric compound having an oxidized surface, said compound having the general chemical formula $R_xWO_3$ where R represents an alkali metal and $x$ represents a value of about 0.66.

3. A current rectifier comprising an electrode of a non-stoichiometric compound having an oxidized surface, said compound having the general chemical formula $R_xWO_3$ where R represents sodium and $x$ lies between 0.5 and 1.

4. A current rectifier comprising an electrode of a non-stoichiometric compound having an oxidized surface, said compound having the general chemical formula $R_xWO_3$ where R represents sodium and $x$ represents a value of about 0.66.

5. A current rectifier comprising an electrode of a non-stoichiometric compound having an oxidized surface, and a counter-electrode of a soft metal in contact with the oxidized surface of said electrode, said compound having the general chemical formula $R_xWO_3$ where R represents an alkali metal and $x$ lies between 0.5 and 1.

6. A current rectifier comprising an electrode of a non-stoichiometric compound having an oxidized surface, and a pointed counter-electrode of a soft metal in contact with the oxidized surface of said electrode, said compound having the general chemical formula $R_xWO_3$ where R represents an alkali metal and $x$ lies between 0.5 and 1.

7. In the method of producing a rectifier the steps comprising forming a non-stoichiometric compound of the general chemical formula $R_xWO_3$ where R represents an alkali metal and $x$ lies between 0.5 and 1 and subsequently forming a barrier layer on a part thereof by surface oxidation.

8. In the method of producing a rectifier the steps comprising forming a non-stoichiometric compound of the general chemical formula $R_xWO_3$ where R represents an alkali metal and $x$ lies between 0.5 and 1 and subsequently forming a barrier layer on a part thereof by electrolytic oxidation.

9. In the method of producing a rectifier the steps comprising forming a non-stoichiometric compound of the general chemical formula $R_xWO_3$ where R represents an alkali metal and $x$ lies between 0.5 and 1 and subsequently forming a barrier layer on a part thereof by electrolytic oxidation in a lead nitrate solution.

References Cited in the file of this patent

UNITED STATES PATENTS

| | | |
|---|---|---|
| 1,955,564 | Rupp | April 17, 1934 |
| 2,197,497 | Giesler et al. | April 16, 1940 |

OTHER REFERENCES

Huibregtse et al.: Physical Review, vol. 84, No. 1, October 1, 1951, pp. 142–44.

Brimm et al.: J. Am. Chem. Soc. 73 (1951), pp. 5427–32.